(12) United States Patent
Thome

(10) Patent No.: US 12,163,865 B2
(45) Date of Patent: Dec. 10, 2024

(54) DETECTING DAMAGE USING AN ODOR SENSOR

(71) Applicant: KSB SE & Co. KGaA, Frankenthal (DE)

(72) Inventor: Patrick Thome, Frankenthal (DE)

(73) Assignee: KSB SE & Co. KGaA, Frankenthal (DE)

( * ) Notice: Subject to any disclaimer, the term of this patent is extended or adjusted under 35 U.S.C. 154(b) by 0 days.

(21) Appl. No.: 17/596,142

(22) PCT Filed: May 29, 2020

(86) PCT No.: PCT/EP2020/064965
§ 371 (c)(1),
(2) Date: Dec. 3, 2021

(87) PCT Pub. No.: WO2020/245042
PCT Pub. Date: Dec. 10, 2020

(65) Prior Publication Data
US 2022/0236135 A1    Jul. 28, 2022

(30) Foreign Application Priority Data

Jun. 5, 2019   (DE) ..................... 10 2019 003 924.6

(51) Int. Cl.
| | | |
|---|---|---|
| *G01M 13/04* | (2019.01) | |
| *G01M 3/18* | (2006.01) | |
| *G01M 13/005* | (2019.01) | |

(52) U.S. Cl.
CPC .......... *G01M 3/183* (2013.01); *G01M 13/005* (2013.01); *G01M 13/04* (2013.01)

(58) Field of Classification Search
CPC .......... G01M 3/16; G01M 3/20; G01M 3/226; G01M 3/183; G01M 13/005; G01M 13/04; G01M 13/02; G01M 13/022
See application file for complete search history.

(56) References Cited

U.S. PATENT DOCUMENTS

| | | |
|---|---|---|
| 2007/0293997 A1 | 12/2007 | Couch |
| 2014/0096590 A1* | 4/2014 | Amin .................... H04W 4/029 73/23.34 |

(Continued)

FOREIGN PATENT DOCUMENTS

| | | |
|---|---|---|
| DE | 10 2017 219 747 A1 | 5/2018 |
| DE | 10 2018 116 282 A1 | 1/2019 |

(Continued)

OTHER PUBLICATIONS

English Translation of JP-2003166696-A (Year: 2003).*

(Continued)

*Primary Examiner* — Alexander A Mercado
(74) *Attorney, Agent, or Firm* — Crowell & Moring LLP

(57) ABSTRACT

A method for detecting damage to one or more components of a fluid-conducting device such as a pump assembly, valve or the like uses at least one odor sensor to detect an odor produced by one of the components and transmit an odor profile to an evaluation unit. The evaluation unit compares the odor profile with one or more characteristic odor profiles to determine whether an odor indicative of a degraded component is present. If the detected odor profile matches a characteristic odor profile match, an output signal is generated in an output unit.

4 Claims, 2 Drawing Sheets

(56) References Cited

U.S. PATENT DOCUMENTS

| | | | |
|---|---|---|---|
| 2014/0272499 A1 | 9/2014 | Duncan et al. | |
| 2016/0091470 A1* | 3/2016 | Gafsou | G01N 33/0034 |
| | | | 73/23.34 |
| 2018/0038414 A1* | 2/2018 | Sasao | G01M 13/04 |
| 2018/0130198 A1 | 5/2018 | Kikuchi et al. | |
| 2019/0012852 A1 | 1/2019 | Dai et al. | |
| 2019/0086382 A1* | 3/2019 | Inaba | G01N 33/2888 |
| 2019/0366663 A1* | 12/2019 | Judd | B29D 30/0654 |

FOREIGN PATENT DOCUMENTS

| | | | | |
|---|---|---|---|---|
| FI | 861211 A | | 9/1986 | |
| JP | 2003166696 A | * | 6/2003 | C11D 3/1286 |
| WO | WO 2014/026717 A1 | | 2/2014 | |
| WO | WO 2018/064264 A1 | | 4/2018 | |

OTHER PUBLICATIONS

International Preliminary Report on Patentability (PCT/IB/338 & PCT/IB/373) issued in PCT Application No. PCT/EP2020/064965 dated Dec. 16, 2021, including English translation of document C2 (Japanese-language Written Opinion (PCT/ISA/237) filed on Dec. 3, 2021) (eight (8) pages).

International Search Report (PCT/ISA/210) issued in PCT Application No. PCT/EP2020/064965 dated Oct. 2, 2020 with English translation (four (4) pages).

German-language Written Opinion (PCT/ISA/237) issued in PCT Application No. PCT/EP2020/064965 dated Oct. 2, 2020 (five (5) pages).

German-language Office Action issued in German Application No. 10 2019 003 924.6 dated Mar. 3, 2020 (eight (8) pages).

Chinese-language Office Action issued in Chinese Application No. 202080041247.1 dated Jun. 6, 2024 with partial English translation (12 pages).

* cited by examiner

DETECTING DAMAGE USING AN ODOR SENSOR

BACKGROUND AND SUMMARY OF THE INVENTION

The invention relates to a method for detecting damage to components of a fluid-conducting device, such as a pump assembly, valve or the like.

Modern fluid-conducting devices are nowadays fitted with a large number of sensors, by means of which the state of the fluid-conducting device can be monitored and possible damage can be detected at any time. Such sensors are conventionally based on acoustic, optical or vibrational concepts. However, not all possible damage can be detected using only such sensors. For example, a change in the vibration may indicate impending bearing damage. However, other reasons may also be responsible for such a change, so that it is not possible to state with absolute certainty whether replacement of the bearing is actually necessary.

Components can generally be replaced only when the fluid-conducting device is at a standstill. Since such a standstill is usually associated with costs for the operator of such a device, components should be replaced only when it is actually necessary. However, it cannot be ensured by means of the sensors used hitherto that a standstill of the fluid-conducting device takes place when such damage is actually present.

For this reason, the object underlying the invention is to improve, or expand, the sensor system of a fluid-conducting device such that damage to components of the device can more reliably be predicted.

This object is achieved by a method as disclosed herein, wherein at least one odor sensor detects an odorous substance produced by one of the components of the fluid-conducting device and transmits an odor profile of the odorous substance to an evaluation unit, wherein the evaluation unit compares the odor profile with one or more characteristic odor profiles and wherein an output signal is generated in an output unit if the odor sensor detects a characteristic odor profile.

Such an odor sensor is conventionally also referred to as an "electronic nose". Such a gas sensor consists of a plurality of individual sensor elements, the signals of which are analyzed in the evaluation unit by means of mathematical methods, wherein typical odor patterns, or odor profiles, are detected. An odor profile means the ratio of the signal strengths of the individual sensor elements to one another, which can also be envisaged, as a geometric pattern when plotted about a common center point, as a star with rays of different lengths.

There come into consideration as the odor sensor usually sensors based on semiconducting metal oxides (MOX sensors), sensors with electrically conducting polymers, and sensors that utilize a mass effect.

In a preferred further development of the invention, at least one of the components is a sliding ring seal. By means of sliding ring seals, rotating components, for example shafts, can be sealed with respect to stationary components, for example the housing. The main components are often two rings which slide on one another, one of which is seated rigidly in the stationary housing while the other is fastened in a rotationally fixed manner to the shaft. By rotation of the opposing sealing faces, a sealing gap is produced, wherein the surrounding medium forms a lubricating film between the sealing faces. Sealing of the rings with respect to the shaft and the housing often takes place by means of secondary seals, for example in the form of additional O-rings or packings.

If such a seal is damaged, however, the conveyed medium can escape and emit an odorous substance. This effect can be enhanced in that the conveyed medium impinges on heated components, so that a small amount of the conveyed medium evaporates, or small droplets of the conveyed medium are dispersed in the surrounding area. These odorous substances can be detected by odor sensors. To this end, it is necessary to mount the odor sensor, or the odor sensors, in close proximity to the sliding ring seals.

Alternatively or in addition, at least one of these components can also be a bearing. Such bearings can be, for example, rolling bearings or also sliding contact bearings. In both cases, the bearing must have a sufficient amount of a lubricant, for example oil or grease. If bearing damage is impending, this is usually accompanied by an increase in the friction within the bearing. This friction results in a rise in the temperature of the lubricant, so that here too, small amounts of lubricant in the form of microscopic particles pass into the surrounding area. Damage to a bearing thus likewise produces an odorous substance, which has a characteristic odor profile which can be detected by odor sensors. Here too, an arrangement in close proximity to the bearings is advantageous.

Alternatively or in addition, at least one of the components can be a shaft coupling. By means of shaft couplings, shafts can be connected together. Shaft couplings are either stiff, torsionally stiff or torsionally flexible and contain elements made of rubber, via which, for example, a certain damping can be achieved. If the shaft couplings are damaged, this can be reflected in a relative movement between the shaft coupling and one of the shafts. This relative movement results in friction and ultimately in heating of the rubber elements. These thereby produce an odorous substance, which likewise has a characteristic profile. Analogously to the other possible components, an odor sensor is therefore to be arranged in close proximity to a shaft coupling.

In principle, it is sufficient within the scope of the invention if one or more odor sensors detects only the odorous substances produced by one component. Preferably, however, the method according to the invention is carried out on all the relevant components, so that, for example, one or more odor sensors are always provided for the bearings, for the sliding ring seals and for the shaft couplings.

Moreover, the invention is also not limited only to such components. The method according to the invention can be used for all the components of a fluid-conducting device, for example also O-rings, which in the case of damage produce an odorous substance with a characteristic odor profile. Use in the drive motor of the fluid-conducting device, for example, is also possible.

Irrespective of the specific components, however, at least one odor sensor is preferably associated with each relevant component.

In a further development of the invention, the evaluation unit has a memory in which the characteristic odor profiles are stored. The number and type of odor profiles is hereby governed by the components, or by the odor sensors associated with these components. If, for example, only bearings and sliding ring seals are fitted, it is not necessary to store a characteristic odor profile that indicates damage to a shaft coupling. In principle, however, it is also possible to store all the relevant characteristic odor profiles, so that the evaluation unit can be used universally on different fluid-conducting devices.

Moreover, it is advantageous, in a particularly preferred embodiment, if the output signal is a graphic and/or acoustic signal. An acoustic signal can be, for example, a warning sound which is outputted continuously or intermittently. Alternatively, a voice message which refers to specific damage is also conceivable. A graphic signal can be implemented, for example, via a warning indicator. In the simplest case, this is a warning lamp. Alternatively, the output signal can also be outputted on a screen, for example a computer or mobile phone, in particular smartphone, tablets, etc., wherein the specific damage can then advantageously be indicated. It is, however, also possible in principle that both an acoustic and a graphic output signal is generated.

The at least one odor sensor is preferably fitted fixedly in or on the fluid-conducting device. As a result, the odor sensors can purposively be used where damage to a component is to be expected.

The method according to the invention can in principle be carried out independently. Preferably, however, it is used in combination with other monitoring systems. Thus, acoustic, optical or vibration sensors can additionally be provided, so that damage can be detected by a large number of different sensors. The accuracy and the reliability is thereby increased significantly.

The invention further includes an apparatus for carrying out the method as disclosed herein, and the use of an odor sensor for monitoring damage to components of a fluid-conducting device. All features that are mentioned in connection with the method apply also to the apparatus.

The invention will be explained in greater detail hereinbelow by means of an example.

DETAILED DESCRIPTION

Figure 1:
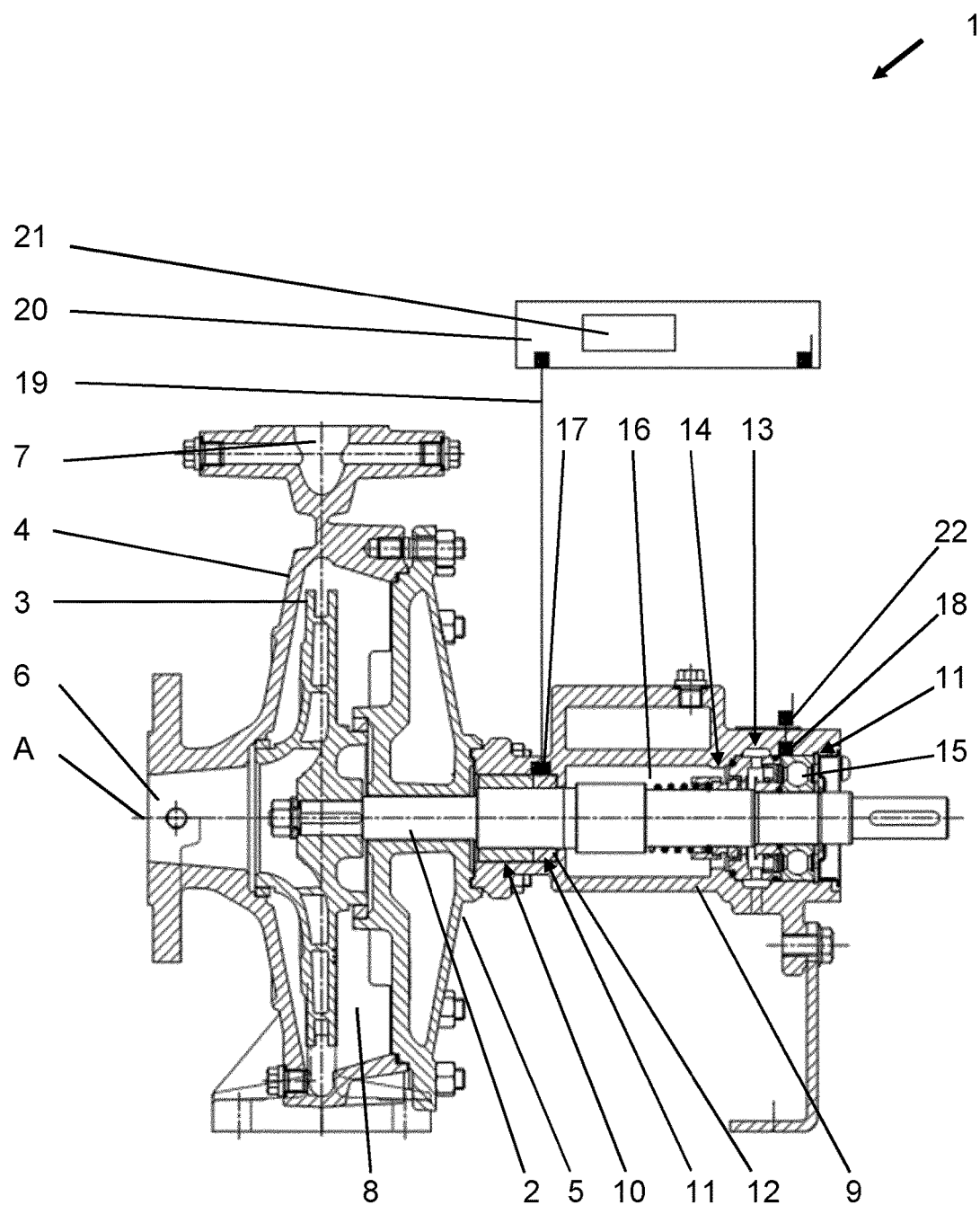
FIG. 1 shows a fluid-conducting device in the form of a pump assembly.

FIG. 1 shows a fluid-conducting device 1, by way of example in the form of a pump assembly. In the exemplary embodiment, the device is a single-stage centrifugal pump with a shaft 2. The shaft 2 can be driven in rotation about a longitudinal center axis A extending in the axial direction. The shaft 2 carries an impeller 3 at one end. The impeller 3 is enclosed by a hydraulic housing 4 with a housing cover 5 arranged thereon. The hydraulic housing 4 has an inlet opening 6 for drawing in a conveyed medium, and an outlet opening 7 for discharging the conveyed medium. The housing cover 5 is arranged on the side of the hydraulic housing 4 opposite the inlet opening 6.

The shaft 2 extends from a flow chamber 8, delimited by the hydraulic housing 4 and the housing cover 5, through the housing cover 5 and through a bearing carrier housing 9, which is fastened to the housing cover 5. The bearing carrier housing 9 has, close to the housing cover 5, a first receiving region 10 in which there is arranged a component 11 to be monitored in the form of a sliding ring seal assembly 12. In a second receiving region 13 remote from the housing cover 5 there are arranged a shaft seal system 14 and a component 11 to be monitored in the form of a bearing 15 configured as a rolling bearing. The bearing carrier housing 9 and also the sliding ring seal assembly 12 and the shaft seal system 14 with the bearing 15 define a chamber 16.

The end of the shaft 2 opposite the impeller 3 is guided out of the bearing carrier housing 9 and attached to a drive shaft of a motor, not shown, in particular an electric motor.

By way of example of a possible arrangement of odor sensors, a first odor sensor 17 and a second odor sensor 18 are shown. The odor sensor 17 is connected via a connecting line 19 to an evaluation unit 20. The evaluation unit 20 has a memory 21. The odor sensor 18 has a transmitter or transceiver 22 or is connected to such a transmitter or transceiver, and transmits the data via radio to the evaluation unit 20. The evaluation unit 20 can have means, not shown, which permit an output signal in the form of a graphic and/or acoustic signal. Alternatively and/or in addition, the evaluation unit 20 can forward, or transmit, an output signal to another output unit 24 shown in FIG. 2 via a connection line or via radio, for example to a computer or a mobile phone, in particular a smartphone, tablet, etc.

Figure 2:
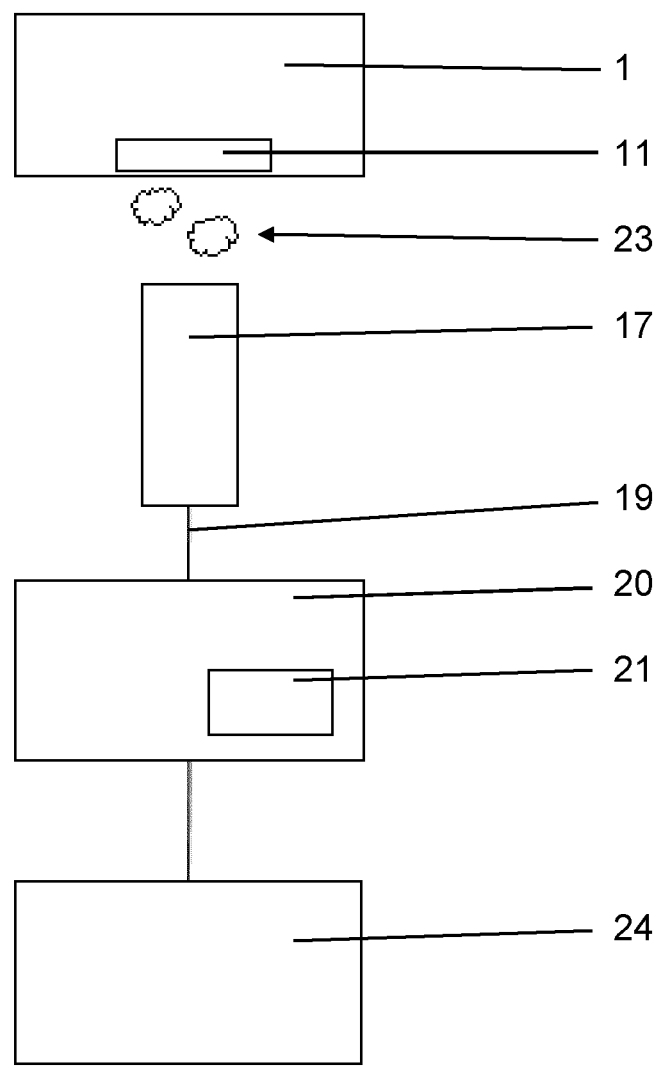
FIG. 2 shows a schematic set-up of an apparatus for carrying out the method according to an embodiment of the invention.

FIG. 2 shows a schematic set-up of an apparatus for carrying out the method according to the invention. The component 11 is part of a fluid-conducting device 1 and represents, for example, a sliding ring seal, a bearing or a shaft coupling. If the component 11 is damaged, it emits an odorous substance 23, which can be detected by means of an odor sensor 17, 18. The odor sensor 17 or 18 is arranged in close proximity to the component 11 so that any damage can be detected at an early stage.

As soon as the component 11 emits an odorous substance 23, this is detected by the odor sensor 17 or 18 and its odor profile is transmitted to the evaluation unit 20. Transmission of the odor profile can take place, as illustrated, via the connecting line 19 or via radio. A large number of characteristic odor profiles are stored in the memory 21 of the evaluation unit 20. These characteristic odor profiles are odor profiles which can be associated with different types of damage. These types of damage are directly dependent on the monitored component 11.

The evaluation unit 20 compares the odor profile detected by the odor sensor 17 or 18 with the characteristic odor profiles stored in the memory 21. If the detected odor profile of an odorous substance 23 matches one of the characteristic odor profiles, a signal is transmitted to an output unit 24, which generates an output signal. The output unit 24 is either part of the evaluation unit 20 or is a separate unit which can be connected to the evaluation unit 20 via a connection line or via radio. The output unit can be, for example, a computer or a mobile phone, in particular a smartphone, tablet, etc.

The output signal can be, for example, an acoustic or a graphic signal. It is, however, in principle also possible that both an acoustic and a graphic output signal are generated.

The invention claimed is:

1. A method for detecting damage in a bearing of a fluid-conducting device, comprising the steps of:
   conducting a fluid through the fluid-conducting device;
   detecting, using at least one odor sensor, a semiconducting metal oxide odorous substance characteristic of a component failure produced by the bearing while the fluid is being conducted through the fluid-conducting device;
   transmitting an odor profile of the semiconducting metal oxide odorous substance to an evaluation unit;
   comparing, using the evaluation unit, the detected odor profile with one or more characteristic odor profiles;

generating an output signal if the evaluation unit determines that the detected odor profile corresponds to at least one of the one or more characteristic odor profiles, wherein
the at least one odor sensor fixed to a bearing carrier housing of the fluid-conducting device, and
the fluid-conducting device is a pump assembly.

2. The method as claimed in claim 1, wherein
the one or more characteristic odor profiles are stored in a memory of the evaluation unit.

3. The method as claimed in claim 1, wherein
the output signal is one or both of a graphic and an acoustic signal.

4. An apparatus for detecting damage to a bearing of thea pump assembly, comprising:
a bearing carrier housing;
at least one odor sensor that is fixed to the bearing carrier housing;
an evaluation unit; and
an output unit, wherein
the at least one odor sensor is configured to: i) detect semiconducting metal oxide odorous substance produced by the bearing, and ii) transmit an odor profile of the semiconducting metal oxide odorous substance to the evaluation unit,
the evaluation unit is configured to compare the odor profile with one or more characteristic odor profiles,
the output unit is configured to generate an output signal when the odor sensor detects a characteristic odor profile, and
the at least one odor sensor is fixed in the bearing carrier housing of the pump assembly.

* * * * *